July 14, 1925.
E. C. RAMSEY
1,546,315
TIRE CHAIN ATTACHMENT FOR VEHICLE WHEELS
Filed March 3, 1924
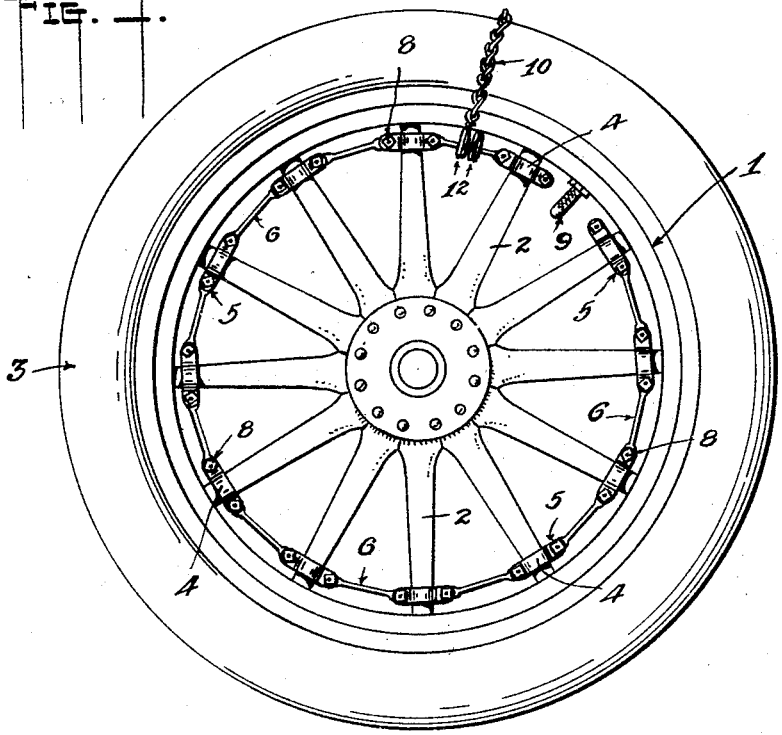
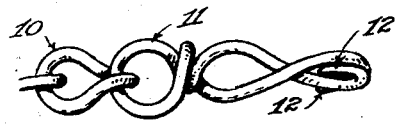
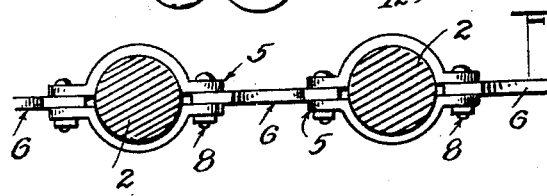
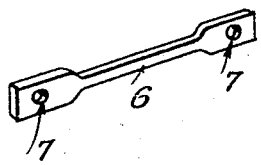
INVENTOR.
E.C.Ramsey,
BY
*L. M. Thurlow*
ATTORNEY.

Patented July 14, 1925.

1,546,315

UNITED STATES PATENT OFFICE.

EMMER C. RAMSEY, OF DEER CREEK, ILLINOIS.

TIRE-CHAIN ATTACHMENT FOR VEHICLE WHEELS.

Application filed March 3, 1924. Serial No. 696,516.

*To all whom it may concern:*

Be it known that I, EMMER C. RAMSEY, a citizen of the United States, residing at Deer Creek, in the county of Tazewell and State of Illinois, have invented new and useful Improvements in Tire-Chain Attachments for Vehicle Wheels; and I do hereby declare that the following is a full, clear, and exact description of the invention, which will enable others skilled in the art to which it appertains to make and use the same.

This invention relates to improvements in tire chain holding means for vehicle wheels.

It has for its object to provide a means permanently attached to a wheel that will be light in weight yet strong and rigid and that will be as inconspicuous as possible, to which cross chains may be quickly attached and from which they can be as easily and readily removed with the least expense of time and energy.

I am well aware of the fact that it is not new to place a ring or band of one form or another permanently upon a wheel for receiving cross chains but they are usually such as to retain mud, heavy and unsightly and not of a form to be most convenient.

It is my purpose to provide means that besides being light in weight can be so applied that the wheel is braced throughout by applying a clamp to each spoke and connecting the clamps with one another by a linkage of a peculiar type to which the so called "cross" chains can be attached.

In the drawing hereto attached,

Figure 1 is a side elevation of a vehicle wheel showing my invention applied thereto.

Figure 2 is a side elevation of a snap hook.

Figure 3 is a transverse section of two of the spokes of a wheel showing my form of clamping means and connecting linkage, and Figure 4 shows in perspective a link shown in Figure 3.

The characters 1 and 2 designate the rim and spokes, respectively, of a vehicle wheel, and 3 the tire. My invention includes a clip made up preferably of pairs of plates 4 shaped to and adapted to clamp around each of the spokes 2 as most clearly shown in Figure 3, said plates being extended into ears adapted to receive between them the opposite ends of members 6 each having a hole 7 in its ends. A bolt 8 passes through each pair of ears 5 and through one of the holes 7 serving to clamp the plates and linking members firmly in connected relation. And while I may use a set of the clamps 4, 5 and a link member 6 at each of every sixth space in the wheel, for example, leaving the other spaces free, I prefer to extend the linkage entirely around the wheel in an unbroken band except where the usual valve stem and its cap denoted at 9 extends between two of the spokes. However, if placed nearer the center of the wheel the linkage may then, of course, be complete and unbroken by being placed outside of the said cap 9.

This arrangement, besides providing for attaching the cross chains, to be described, at any point or at as many points as desired, constitutes a more effective bracing for the wheel and gives it more strength than the spoke alone provides.

One of the cross chains is denoted at 10 in Figure 1, each end terminating in a spring-wire fastening best shown in Figure 2. This includes an eye 11 to which one end of the chain 10 is attached, the extremities of the fastening terminating in two hooked portions 12 bent in opposite directions and adapted to overlie one another as shown, the spring of the wire due to the construction holding the hooks in close relation under considerable tension. This device in itself is not new and no claim of novelty is attached thereto herein but it is described to better show its use in connection with the link members 6 herein.

Each end of the chain is provided with one of said snap-fastenings, Figure 1, and in applying the said chain to the wheel one of the fastenings is placed so that the hook extensions 12 lie parallel to one of the links 6. Then by firmly pushing the two hooks against the link they will be forced apart and pass over the latter looping about the same without any chance of becoming separated therefrom. The chain is then passed over and around the tire, the fastening at its other or free end being engaged with the link 6 in the same way as the first, and as many of the chains as desired may be applied to the wheel according to the wish of the user.

This type of fastening has been found to answer as the quickest form and the one most easily and conveniently handled particularly in cold weather when the fingers of the hand are numbed with the cold, and also because of the fact that there are no spring catches to become frozen in place or prevented being moved by accumulations of ice or mud. That is to say, it is only necessary to turn the fastener on its axis, when desiring to remove it, so that the two spring extremities remote from the hooks 12 engage the link 6 to cause separation of said hooks to permit them to be drawn over and away from engagement with said link. However, the latter is given a form peculiarly required for the most easy removal of the hooks. In Figure 4 the shank of the link is shown of a square form, or at least rectangular and with sharp corners rather than of a round form. Since of this preferred form the measurement between two diagonal corners of the shank is, of course, greater than the diameter measured between any two diametrically opposite flat faces and therefore by tilting the fastener, in removing it, so that the diagonal corners can be used as fulcrums the hooks can be spread widely enough apart to permit the extremities thereof to clear the shank and pass over the flat sides thereof, this peculiar manipulation of the fastener being readily grasped in the mind of the person performing the act. In other words, the peculiar form of the hooks of the fastener as bought in the market require the special form of square shanked link where a link having a round form of shank would not answer as well if the device is to be most quickly and easily used in practice on the road.

Since the attachment of the clamps and links, lies midway between the two sides of the rim and tire and between the centers of the spokes it is out of the way as a collector of mud, it can be made of light construction and yet be strong and rigid, and rather adds to the general appearance of the wheel than otherwise as a permanent fixture.

I claim:

1. In a device of the nature described, a link adapted to extend between a pair of spokes of a vehicle wheel, and a member at each end of an anti-skid cross chain adapted to engage the link, the latter at the place of engagement of said members having at least two unequal measurements in cross section.

2. In a device of the nature described, a link adapted to extend between a pair of spokes of a vehicle wheel relatively thereto and having a substantially square form in cross section, and a member at each end of an anti-skid chain adapted to be engaged over the same.

In testimony whereof I affix my signature in presence of two witnesses.

EMMER C. RAMSEY.

Witnesses:
L. M. THURLOW,
EDNA O. SANDS.